March 31, 1931.　　　　C. G. ATHA　　　　1,799,077
CLUTCH DEVICE FOR AUTOMOBILES
Filed Aug. 16, 1928　　　2 Sheets-Sheet 1
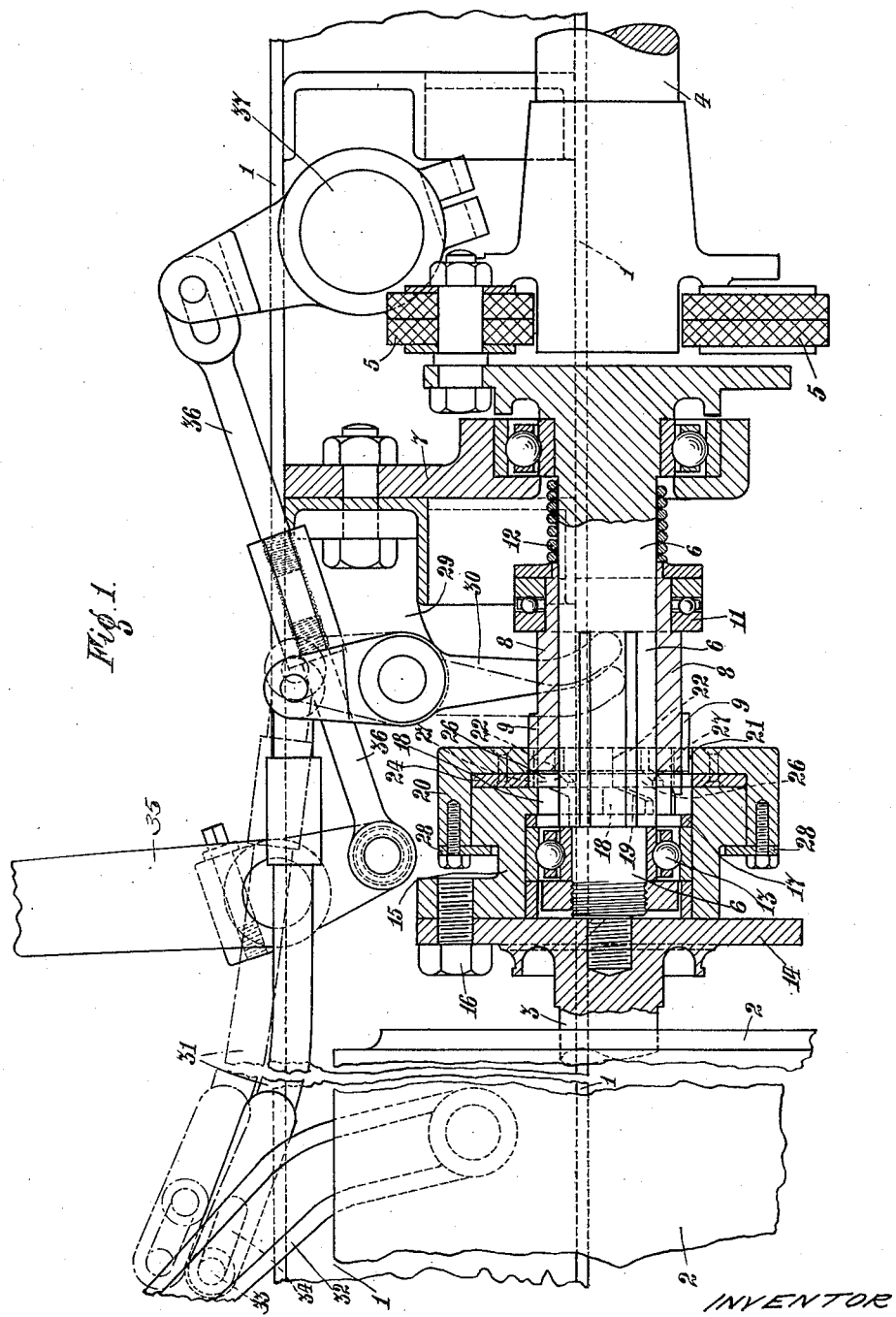
INVENTOR
C.G. ATHA March 31, 1931.  C. G. ATHA  1,799,077
CLUTCH DEVICE FOR AUTOMOBILES
Filed Aug. 16, 1928  2 Sheets-Sheet 2
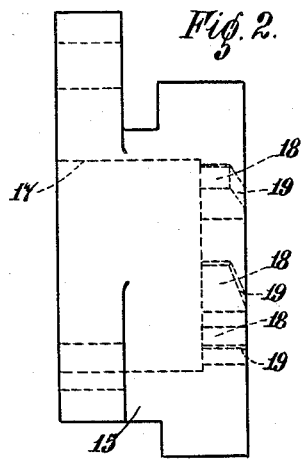
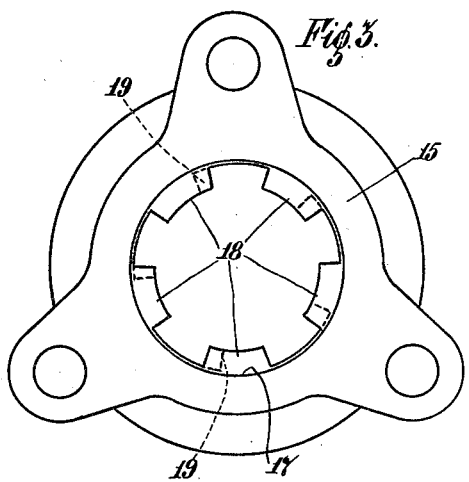
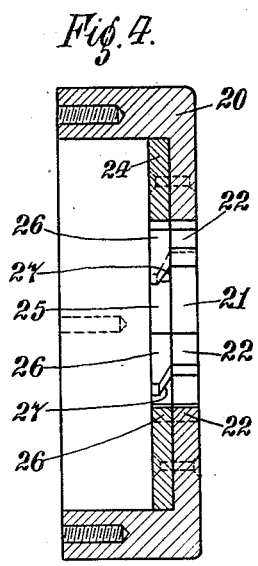
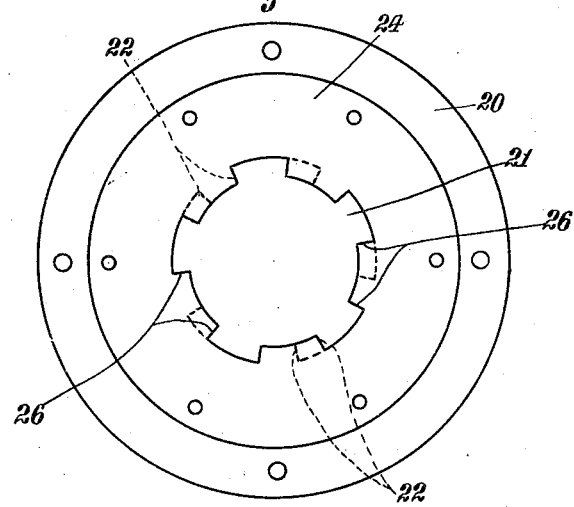
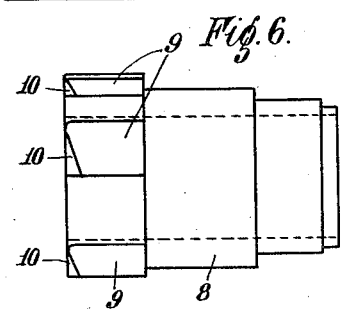
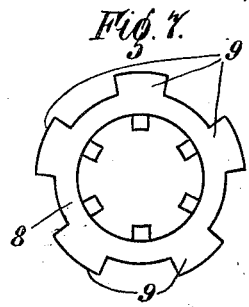
INVENTOR
C. G. ATHA Patented Mar. 31, 1931

1,799,077

UNITED STATES PATENT OFFICE

CHARLES GURNEY ATHA, OF BIGGAR, SCOTLAND, ASSIGNOR TO CLIFTON LIMITED, OF DOUGLAS, ISLE OF MAN, ENGLAND

CLUTCH DEVICE FOR AUTOMOBILES

Application filed August 16, 1928, Serial No. 300,047, and in Great Britain October 28, 1927.

This invention relates to the embodiment in the transmission mechanism of motor vehicles of an auxiliary clutch device for facilitating the changing of gear and coasting of the vehicle.

The auxiliary clutch device, which is preferably embodied in the transmission mechanism of a motor vehicle behind the gear box, comprises two rotary inter-engageable members, one a driving member and the other a driven member, and a third or intermediate rotary member, the arrangement being such that normally the two members positively engage each other for both directions of rotation, but, when disengaged by control means operated by the driver, and the speed of rotation of the driven member exceeds that of the driving member, the intermediate member prevents their re-engagement when the control means has been released, until the driving member is again rotating at the same or substantially the same speed as the driven member when re-engagement automatically occurs under resilient action.

The auxiliary clutch will, if disengaged along with the main clutch before a gear change is made, free the gear box from both engine and rear axle and allow a sweet gear change to be made in the more or less idle gear box. Further, a solid drive from the engine to the Cardan shaft will not be re-established until the rear part of the transmission, including the Cardan shaft and the driven member of the auxiliary clutch, is rotating at the same or substantially the same speed as the main shaft of the gear box and the driving member of the auxiliary clutch, with the result that the jerking or jolting which so often occurs in gear changing is automatically prevented or reduced.

The arrangement has the further advantage that a solid drive is always available for reversing.

Preferably, in a motor car, the auxiliary clutch is coupled up to the usual clutch pedal so that, on a first depression of the pedal, the main friction clutch is released, and, on a farther depression thereof, the auxiliary clutch is disengaged.
The auxiliary clutch may comprise a sliding member adapted to be permanently connected to the Cardan shaft of the automobile, a driving member adapted to be permanently connected to the gear box shaft, means for sliding the sliding member into and out of engagement with the driving member, and a rotary member intermediate of the sliding and driving members and which is so shaped that, when the sliding member and the driving member have been disengaged and the speed of rotation of the former exceeds that of the latter, the intermediate member interposes between the sliding and driving members thereby preventing their re-engagement until the driving member is rotating slightly faster than the sliding member when the intermediate member is automatically moved so as to allow the other members to re-engage.

In order that the invention may be clearly understood one embodiment thereof will be described by way of example and with reference to the accompanying drawings, whereon:—

Fig. 1 is a sectional longitudinal elevation of the auxiliary clutch as fitted in a car, Fig. 2 is a side elevation of the rotating driving member, Fig. 3 is a front elevation of the same, Fig. 4 is a sectional side elevation of the rotary intermediate member, Fig. 5 is a front elevation of the same, Fig. 6 is a side elevation of the rotary driven member, and Fig. 7 is a front elevation of the same.

Referring more particularly to Fig. 1, the numeral 1 denotes the chassis girders of the car under which is the usual gear box 2 from which the shaft 3 emerges. 4 is the Cardan shaft on whose forward end is the flexible coupling 5 driven from an independent intermediate length of shaft 6, extending from the rear end of the gear box shaft 3. The rear end of the shaft 6 is supported in a fixed bracket 7.

A sliding sleeve 8 (see Figs. 6 and 7) is splined on the shaft 6. This sleeve has a series of external teeth 9 each of which may be bevelled at its forward end as indicated at 10 (Fig. 6). A ball thrust washer 11 is mounted on the rear end of this sleeve and a spring 12 on the shaft 6 tends to thrust the sleeve forward (see Fig. 1). At the forward end of the shaft 6 a ball bearing 13 is secured between a nut screwed on to the shaft end and a shoulder on the shaft.

The rear end of the gear box shaft 3 is provided with a flange 14 to which a female driving member 15 (see Figs. 2 and 3) is secured by three studs 16. This member 15 has a cylindrical internal surface at 17 within which the ball bearing 13 on the shaft 6 fits so that the member 15 can turn upon the shaft 6. At its rear end the member 15 has a number of internal teeth 18 spaced and shaped to correspond with the external teeth 9 on the sliding sleeve or male member 8. These teeth 18 are shown bevelled at their rear edges as indicated at 19.

An intermediate member or cover 20 (see Figs. 4 and 5) is fitted over an external cylindrical portion of the female member 15 so that it can turn thereon. The cover 20 is cup-shaped and has a central aperture 21 in its end to accommodate the shaft 6. Around this aperture there is a series of teeth 22 considerably less in size circumferentially than the teeth on the member 15. On the inner face of the end of the cover 20 a washer 24 is fitted and held in place by rivets. The washer has a central aperture 25 of the same diameter as the cover aperture 21. A series of teeth 26 is arranged around the aperture 25, these being larger circumferentially than the teeth 22 of the cover, so that at one side of each of the teeth 22 a landing 27 is formed. The spaces between the teeth 26 allow of the passage of the sliding member 8. These landings 27 are shown bevelled. When the cover and washer are in place on the shaft 6 and member 15, a ring 28 is secured to the forward face of the cover to retain it in position. The teeth 22 and 26 together form compound teeth of L-shape (see Fig. 4).

A bracket 29 on the chassis carries a pivoted operating fork 30 adapted to bear on the forward side of the thrust washer 11 on the sleeve 8. The fork is connected by a rod 31 of adjustable length and a pin and slot arrangement 33, 34 with the usual clutch pedal 32 of the car, this pedal being connected to the usual friction clutch in front of the gear box and not shown.

The functioning of the device is as follows:—

Normally the sleeve 8 on the shaft 6 is thrust by the spring 12 forward and, passing through the cover 20 and washer 24, its teeth 9 engage with the teeth 18 of the female member 15. As the female member 15 is rotated by the engine and the sleeve 8 is splined to the shaft 6 a solid drive between the gear box and the rear wheels of the car is established.

In Fig. 1, the sleeve 8 is shown slid back out of engagement with the member 15.

To change gear, the clutch pedal 32 is depressed. The first part of its movement causes disengagement of the usual friction clutch between the engine and gear box. Farther depression of the clutch pedal takes up the lost motion of the pin and slot and turns the fork 30 counter-clockwise, thus drawing the sleeve 8 out of engagement with the female member 15. The gear box is now isolated both from the engine and from the rear wheels and its parts will at once slow down, especially if a moderately effective clutch stop is used. It will be noticed that in its extreme rear position the teeth of the sleeve are still engaging with the cover 20 but not with the washer 24. With the gear box in this condition any gear can be engaged without noise or shock, there being no load on any of the parts. As the shaft 6, driven by the rear wheels, is now rotating faster than the gear box shaft 3, the tips of the teeth 9 of the sleeve 8 turn in the openings in the cover 20 until opposite the landings 27, whereafter they will carry the cover 20 round with them independently of the member 15. The clutch pedal is now released and at once engages the usual friction clutch.

If, at this juncture, the sleeve 8 is still rotating faster than the female member 15, the landings 27 will prevent the teeth 9 of sleeve 8 engaging with the member 15 even although the fork 30 has turned to its forward position as shown by the dotted lines in Fig. 1. As soon, however, as the member 15 rotates very slightly faster than the sleeve 8 its friction with the washer 24 carries the washer and cover 20 round also slightly faster than the sleeve 8 whose teeth lag in the cover apertures until they slip off the landings 27 and spring into engagement with the teeth 18 of the member 15, re-establishing the drive after the gear change. The bevelling of the various teeth facilitates this re-engagement.

If, on the other hand, on re-engagement of the friction clutch after the gear change, the engine is running fast enough to drive the car, the gear box is accelerated at once to a speed at which the sleeve 8 can re-engage the member 15 and re-establish the drive.

In both cases, therefore, the drive is not re-established after changing gear until, or unless, the gear box shaft and the Cardan shaft are running at the same speeds (in practice there will be a very slight and negligible difference in speeds.) Thus a sweet gear change is ensured automatically without special skill on the part of the driver. The operation known as "double declutching" is rendered quite unnecessary, nor is it necessary to take into consideration engine, gear box and transmission speeds.

In Fig. 1, the dotted lines show the parts 30, 31, 33 and 34 in their normal position.

If, when the car is descending a hill, the clutch pedal be partially depressed to disengage the friction clutch and the gear lever moved to neutral, the car will coast. To reengage the engine, the clutch pedal should be fully depressed so as to disengage the auxiliary clutch whereafter the gear lever can be moved to engage the desired gear. Reengagement of the engine after coasting is with the conventional transmission a delicate movement requiring much skill and hence coasting is seldom practiced. The auxiliary clutch according to this invention makes the operation perfectly simple.

In bringing the car to rest prior to reversing it is necessary that the clutch pedal should be depressed only so far as to disengage the usual friction clutch, as, if the auxiliary clutch is disengaged, the reverse drive cannot be established with the gear box shaft 3 running reverse. After a little practice, the position of the pedal where only the friction clutch is disengaged can be readily "felt".

The lever 35 shown in Fig. 1 mounted on the chassis is a brake lever connected by a link 36 to the usual brake cross shaft 37. These form no part of the present invention.

Obviously, a number of structural modifications may be made in the arrangement to suit various cars or for other reasons.

I claim:—

1. An auxiliary clutch for embodiment in the transmission mechanism of an automobile comprising a length of shaft adapted to be permanently connected to the Cardan shaft of the automobile, a male member splined thereon, external teeth on said male member, means for sliding said male member, resilient means acting on said male member, a female member adapted to be permanently connected to the gear box shaft, internal teeth on the female member, an apertured intermediate member between the male and female members, L-shaped teeth around the aperture of the intermediate member which allow the male member to pass into engagement with the female member, but which, when the male and female members have been disengaged and the speed of rotation of the former exceeds that of the latter, interpose between the male and female member until the female member is again rotating slightly faster than the male member, when the friction between the female and intermediate members rotates the latter relative to the male member and allows re-engagement.

2. An auxiliary clutch for embodiment in the transmission mechanism of an automobile comprising a length of shaft adapted to be permanently connected to the Cardan shaft of the automobile, a male member splined thereon, external teeth on said male member, a female member adapted to be permanently connected to the gear box shaft, means for sliding said male member, resilient means acting on said male member, internal teeth on the female member, and an intermediate rotary member made up of an apertured disc normal to the shaft and having internal teeth around the aperture and a washer secured to the face of said disc next the female member and having internal teeth around its aperture larger circumferentially than the teeth of the disc so as to form a landing at one side of each of the teeth of the disc, the teeth on the disc and washer allowing the male member to pass into engagement with the female member, but when the male and female members have been disengaged and the former is rotating faster than the latter, preventing by means of said landings their re-engagement until the female member is again rotating slightly faster than the male member, when the friction between the female and intermediate members rotates the latter relative to the male member and allows reengagement.

3. An auxiliary clutch for embodiment in the transmission mechanism of an automobile comprising a length of shaft adapted to be permanently connected to the Cardan shaft of the automobile, a male member splined thereon, external teeth on said male member, means for sliding said male member, resilient means acting on said male member, a female member adapted to be permanently connected to the gear box shaft and freely rotatable on the length of shaft, internal teeth on said female member, a plane end thereon normal to the shaft, an apertured intermediate member between the male and female members and bearing against the plane end of the latter, L-shaped teeth around the aperture of the intermediate member which allow the male member to pass into engagement with the female member, but which, when the male and female members have been disengaged and the speed of rotation of the former exceeds that of the latter, interpose between the male and female members until the female member is again rotating slightly faster than the male member, when the friction between the female and intermediate members rotates the latter relative to the male member and allows re-engagement.

4. An auxiliary clutch for embodiment in the transmission mechanism of an automobile comprising a length of shaft adapted to be permanently connected to the Cardan shaft of the automobile, a male member splined thereon, external teeth on said male member, means for sliding said male member, resilient means acting on said male member, a female member adapted to be permanently connected to the gear box shaft and freely rotatable on the length of shaft, internal teeth on said female member, a plane end thereon normal to the shaft, and an intermediate rotary member made up of an apertured disc normal to the shaft and having internal teeth around the aperture and a washer secured to the face of the disc next the plane end of the female member against which it bears and having internal teeth around its aperture larger circumferentially than the teeth of the disc so as to form a landing at one side of each of the teeth of the disc, the teeth on the disc and washer allowing the male member to pass into engagement with the female member, but when the male and female members have been disengaged and the former is rotating faster than the latter, preventing by means of said landings their re-engagement until the female member is again rotating slightly faster than the male member, when the friction between the female and intermediate members rotates the latter relative to the male member and allows re-engagement.

5. An auxiliary clutch for embodiment in the transmission mechanism of an automobile comprising a length of shaft adapted to be permanently connected to the Cardan shaft of the automobile, a male member splined thereon, external teeth on said male member, means for sliding said male member, resilient means acting on said male member, a female member adapted to be permanently connected to the gear box shaft and freely rotatable on the shaft of the auxiliary clutch, internal teeth on said female member, a plane end thereon normal to the shaft, a cylindrical external surface on the female member, and an intermediate rotary member made up of an apertured disc normal to the shaft and having internal teeth around the aperture, a cylindrical flange on the disc fitting over, and turning upon, the cylindrical surface of the female member and a washer secured to the face of the disc next the plane end of the female member against which it bears and having internal teeth around its aperture larger circumferentially than the teeth of the disc so as to form a landing at one side of each of the teeth of the disc, the teeth on the disc and washer allowing the male member to pass into engagement with the female member, but when the male and female members have been disengaged and the former is rotating faster than the latter, preventing by means of said landings their re-engagement until the female member is again rotating slightly faster than the male member, when the friction between the female and intermediate members rotates the latter relative to the male member and allows re-engagement.

6. An auxiliary clutch for embodiment in the transmission mechanism of an automobile comprising a length of shaft adapted to be permanently connected to the Cardan shaft of the automobile, a male member splined thereon, external bevelled teeth on said male member, a female member adapted to be permanently connected to the gear box shaft, means for sliding the male member, internal bevelled teeth on the female member, an apertured intermediate member between the male and female members, teeth around the aperture thereof which allow the male member to pass into engagement with the female member, and bevelled landings in conjunction with the teeth of the intermediate member which, when the male and female members have been disengaged and the speed of rotation of the former exceeds that of the latter, interpose between the male and female members until the female member is again rotating slightly faster than the male member, when the friction between the female and intermediate members rotates the latter relative to the male member and allows re-engagement.

7. An auxiliary clutch for embodiment in the transmission mechanism of an automobile comprising a length of shaft adapted to be permanently connected to the Cardan shaft of the automobile, a male member splined thereon, external bevelled teeth on said male member, a female member adapted to be permanently connected to the gear box shaft, means for sliding said male member, resilient means acting on said male member, internal bevelled teeth on the female member, and an intermediate rotary member made up of an apertured disc normal to the shaft and having internal teeth around the aperture and a washer secured to the face of said disc next the female member and having internal bevelled teeth around its aperture larger circumferentially than the teeth of the disc so as to form a landing at one side of each of the teeth of the disc, the teeth on the disc and washer allowing the male member to pass into engagement with the female member, but when the male and female members have been disengaged and the former is rotating faster than the latter, preventing by means of said landings their re-engagement until the female member is again rotating slightly faster than the male member, when the friction between the female and intermediate members rotates the latter relative to the male member and allows re-engagement.

8. An auxiliary clutch for embodiment in the transmission mechanism of an automobile comprising a length of shaft adapted to be permanently connected to the Cardan shaft of the automobile, a male member splined thereon, external bevelled teeth on said male member, means for sliding said male member, resilient means acting on said male member, a female member adapted to be permanently connected to the gear box shaft and freely rotatable on the shaft of the auxiliary clutch, internal bevelled teeth on said female member, a plane end thereon normal to the shaft, a cylindrical external surface on the female member, and an intermediate rotary member made up of an apertured disc normal to the shaft and having internal teeth around the aperture, a cylindrical flange on the disc fitting over, and turning upon, the cylindrical surface of the female member and a washer secured to the face of the disc next the plane end of the female member against which it bears and having internal bevelled teeth around its aperture larger circumferentially than the teeth of the disc so as to form a landing at one side of each of the teeth of the disc, the teeth on the disc and washer allowing the male member to pass into engagement with the female member, but when the male and female members have been disengaged and the former is rotating faster than the latter, preventing by means of said landings their re-engagement until the female member is again rotating slightly faster than the male member, when the friction between the female and intermediate members rotates the latter relative to the male member and allows re-engagement.

9. An auxiliary clutch for embodiment in the transmission mechanism of an automobile, comprising a driving member, a driven member, projections whereby said members engage and an intermediate member coaxial with one of the former members and rotatable therewith by frictional contact, said intermediate member being apertured for the passage through it of the projections to make engagement, and, when the driving and driven members have been disengaged and the speed of rotation of the driven member exceeds that of the driving member, interposing itself between the projections and the said engaging face until the driving and driven members again synchronize when the projections are again freed.

10. An auxiliary clutch for embodiment in the transmission mechanism of an automobile comprising a driving member, a driven member, projections whereby said members engage, an intermediate member coaxial with said driving member and having passages through it by means of which said projections can move through the intermediate member to make engagement, the intermediate member being rotatable with the driving member by frictional contact and when the driving and driven members have been disengaged and the speed of rotation of the driven member exceeds that of the driving member, forming a partition in the path of the projections and preventing their re-engagement until the members again synchronize when re-engagement automatically occurs.

11. An auxiliary clutch for embodiment in the transmission mechanism of an automobile, comprising a driving member, a driven member, projections whereby said members engage and an intermediate member having a central aperture therein and passages around said aperture for the movement of the projections through the intermediate member to make engagement, which passages, when the driving and driven members have been disengaged and the speed of rotation of the driven member exceeds that of the driving member, fail to register with the projections and prevent re-engagement until the driving and driven members again synchronize.

12. An auxiliary clutch for embodiment in the transmission mechanism of an automobile, comprising a driving member, a driven member, projections whereby said members engage, an intermediate member which is coaxial with said driving member and rotatable therewith by frictional contact and has passages through it through which the projections can make engagement, and a number of landings which are adjacent to the said passages and which, when the driving and driven members have been disengaged and the speed of rotation of the driven member exceeds that of the driving member, retain the projections against re-engagement until the driving and driven members again synchronize.

13. An auxiliary clutch for embodiment in the transmission mechanism of an automobile, comprising a driving member, a driven member, projections whereby said members engage, and an intermediate member having a central aperture, passages around said aperture through which the projections can make engagement and a number of landings which are adjacent to said passages and which when the driving and driven members have been disengaged and the speed of rotation of the driven member exceeds that of the driving member, retain the projections against re-engagement until the driving and driven members again synchronize.

14. An auxiliary clutch for embodiment in the transmission mechanism of an automobile, comprising a toothed driving member, a toothed driven member, spring means whereby said driving member and driven member are adapted to be put into engagement with each other, means whereby said driving and driven members are adapted to be disengaged, an intermediate ring member external to and rotatable on said driving member and having projections adapted to be engaged by said driven member when said driven member is disengaged from and rotates faster than said driving member and to hold said driving and driven members out of engagement, and means whereby said projections and driven member are caused to disengage by friction action between said driving member and intermediate member when said driving member rotates faster than said driven member.

15. An auxiliary clutch for embodiment in the transmission mechanism of an automobile, comprising a driving member, a driven member, teeth on said driving member and driven member, spring means whereby said teeth on said driving and driven members are adapted to be engaged, means whereby said teeth are adapted to be disengaged, an intermediate ring member rotatably mounted on said driving member externally of said teeth, projections on said intermediate member adapted both to be engaged by said driven member when said driven member is disengaged from and rotates faster than said driving member and to hold said driving and driven members out of engagement, and means whereby said projections and driven member are caused to disengage by friction action between said driving member and intermediate member when said driving member rotates faster than said driven member.

16. An auxiliary clutch for embodiment in the transmission mechanism of an automobile, comprising a toothed driving member, a toothed driven member, spring means whereby said driving member and driven member are adapted to be put into engagement with each other, means whereby said driving and driven members are adapted to be disengaged, an intermediate ring member external to and freely rotatable on said driving member, parts on said intermediate member adapted to engage with parts on the driven member, so that when the driven member is moved out of engagement with the driving member these parts automatically hold this member out of engagement with the driving member so long as the driven member is rotating faster than the driving member, but when the driving member rotates slightly faster than the driven member the said intermediate member with its parts are moved by the driving member automatically to allow the driven member to engage the driving member under the action of the spring.

17. An auxiliary clutch for embodiment in the transmission mechanism of an automobile comprising a toothed driving member, a toothed driven member, spring means whereby said driving member and driven member are adapted to be put into engagement with each other, means whereby said driving and driven members are adapted to be disengaged, an intermediate ring member external to and rotatable on said driving member and having L-shaped teeth providing landings adapted to be engaged by said driven member when said driven member is disengaged from and rotates faster than said driving member and to space said driving and driven members apart from each other, and means whereby said driven member is caused to be displaced from said landings by friction action between said driving member and intermediate member when said driving member rotates faster than said driven member.

18. An auxiliary clutch for embodiment in the transmission mechanism of an automobile comprising a driving member, a driven member, teeth on said driving member and driven member, spring means whereby said driving and driven members are relatively slidable so as to interengage the teeth thereof, means whereby said teeth are adapted to be disengaged, an intermediate ring member rotatably mounted on said driving member externally of said teeth, L-shaped projections on said intermediate member providing landings adapted to be engaged by said driven member when said driven member is disengaged from and rotates faster than said driving member and to space said driving and driven members a distance apart, and means whereby said projections and driven member are caused to disengage by friction action between said driving member and intermediate member when said driving member rotates faster than said driven member.

In testimony whereof I affix my signature.
CHARLES G. ATHA.